United States Patent Office 3,460,623
Patented Aug. 12, 1969

3,460,623
FOAMS IN ENRICHED GAS DRIVES
Robert O. Leach, Tulsa, Okla., assignor to Pan American Petroleum Corporation, Tulsa, Okla., a corporation of Delaware
No Drawing. Filed Nov. 20, 1967, Ser. No. 684,520
Int. Cl. E21b 43/20
U.S. Cl. 166—273          5 Claims

ABSTRACT OF THE DISCLOSURE

In an enriched gas drive of petroleum from an oil-bearing earth formation, the enriched gas is preceded by a water solution of an oil-sensitive foaming agent. The enriched gas then forms a foam which diverts more of the gas into the low permeability zones than would normally go into these zones. The foam breaks permitting a high injection rate of dry gas to drive the enriched gas through the formation.

SPECIFICATION

In enriched gas drives of petroleum from oil-bearing formations, the enriching hydrocarbon dissolves in the liquid oil as the gas flows past. If sufficient enriching hydrocarbon dissolves in the oil, the liquid phase reaches a composition such that it is displaced by the enriched gas through a transition or mixing zone without a phase change. In other words, a miscible fluid drive occurs. Since enrichment of the gas is expensive, as small a volume as possible of enriched gas is ordinarily used, this being driven with dry natural gas. The basic theory of enriched gas drive is well described in U.S. Patent 2,880,801, Crump.

From the nature of this process, it is obvious that a certain minimum amount of enriched gas must enter any zone of the formation in order to establish the miscible drive. In some formations, the differences in permeabilities of the vairous zones are so great that much more than the minimum amount of enriched gas enters the most permeable zone before the minimum amount has entered the least permeable zone.

It has been previously proposed that a plugging agent such as silica gel, a settable resin, smokes, or the like, be deposited in oil-bearing formations to be subjected to secondary recovery processes such as enriched gas drives. The plugging agent enters both low and high permeability formations but enters the more permeable ones to a greater distance than the less permeable ones. Therefore, the more permeable zones are plugged to a greater degree than the less permeable zones. In the case of enriched gas drives, it would be desirable if the plug could be at least partly removed once a minimum volume of enriched gas enters the low permeability zones without greatly over-treating the high permeability zones. If this could be done, then the dry driving gas could be injected rapidly leading to quick oil recovery and greatly improved economics of the process. It would also be desirable, of course, if the plug could be removed from the low permeability zone first so the enriched gas could be driven through the low permeability zones for a considerable distance before the plug was removed from the higher permeability zones.

An object of the invention is to provide a means for reducing the permeability of the various zones of an oil-bearing formation, the degree of plugging depending on the degree of permeability. A more specific object is to provide a plug which automatically disappears with time so that after a slug of enriched gas has been injected, the following driving gas can be injected at a high rate to provide a quick oil recovery. A still more specific object is to provide a plug which remains in the more permeable zones for a longer time than it remains in the lower permeability zones. Still other objects will be apparent from the following description and claims.

In general, I accomplish the objects of my invention by use of a temporary foam. The foaming agent is injected as a water solution, the foam being formed in the formation by injecting enriched gas. By selecting the type of foaming agent which is used, the concentration of the agent in the water solution, and the amount of solution injected into the formation, it is possible to obtain a temporary, at least partial plugging of the high permeability zones. The low permeability zones are also plugged to some degree, but, as explained below, the plugging is not as great or as long-lasting as it is in the high permeability zones. Eventually, the foam breaks at least partially in all the zones permitting rapid gas injection to drive the enriched gas through the formation.

As mentioned above, the nature of the foaming agent is important. An oil-sensitive agent should be used, that is, one which forms a foam which breaks in the presence of oil. The foam must, of course, be sufficiently stable to provide at least some plugging action in the more permeable zones while the enriched gas is being injected. The foam should not, however, be so stable that the high permeability zones are substantially permanently plugged.

A convenient test of the oil stability of foams is described in U.S. Patent 3,330,346, Jacobs et al. In this test, a sand pack of No. 16 sand is prepared. This is sand with substantially uniform size grains, the average grain barely passing a No. 16 U.S. standard sieve. The pack is about 35 feet long. It is filled first with brine. Then oil displaces most of the brine, after which brine is again forced through the pack until the oil content is reduced to substantially the irreducible minimum volume. Sufficient of an aqueous solution of the foaming agent is then introduced to fill about 20 percent of the pore space of the pack. Finally, gas at a pressure of about 150 pounds per square inch is introduced into the pack to form a foam. Pressure is maintained on the gas for at least about 30 days and the gas flow rate is measured about every day. During the test, the downstream end of the pack is maintained at atmospheric pressure.

This test has the advantage that the brine and oil used in the test can be substantially the same as those present in the actual field operation. The foaming agent can also be used in the concentration to be used in the field and in water substantially the same as that available in the field for preparing the foaming agent solution.

FIGURE 1 of U.S. Patent 3,330,346, Jacobs et al., shows some results of tests of this sort. In these tests, a pack filled with O.K. liquid foam remained rather permanently plugged. After 34 days, it had recovered only about 4 percent of its original permeability. Thus, O.K. liquid foam does not seem sufficiently sensitive to the Dollarhide crude oil used in the test to make its use advisable in my enriched gas drive process for that crude oil. A sand pack plugged with Triton X-100 foam, on the other hand, recovered about 43 percent of its original permeability in 26 days. This material is near the other limit. Foams formed with this agent are so unstable in the presence of Dollarhide crude oil that the foams plug the more permeable zones to only a small degree for only a short time. Triton X-100 would do some good in my process, but a much more stable foam is preferred. Triton QS-15 foam was intermediate in its sensitivity to the Dollarhide crude oil. The sand pack plugged with this zone regained about 22 percent of its permeability in 25 days. This foam is more unstable than is preferred, but would be much more beneficial in my process than Triton X-100 with the Dollarhide crude oil. All three agents are identified chemically in the Jacobs et al. patent.

An agent should be used which is sufficiently oil-sensitive that the sand pack recovers at least about 5 percent of its original permeability in 30 days in the described test. Since all the enriched gas will probably be injected within a period of a month or two, it may be desirable to use somewhat more oil-sensitive foams. In general, a foam is considered to be too oil-sensitive if the sand pack in the described test recovered more than 50 percent of its original permeability in 30 days. Preferably, an agent should be used which forms a foam which permits the sand pack to regain between about 5 and about 10 percent of its original permeability in about 30 days.

The function and advantages of my process can probably best be explained by use of an example. Two zones of an oil-bearing formation are penetrated by a well. They have approximately equal thicknesses and porosities, but the permeability of one is about 200 millidarcys while the permeability of the other is only about 20 millidarcys. A foaming agent solution is injected into the formation. The volume of the solution is about 300 gallons per foot of formation thickness. Since the permeability of one zone is ten times that of the other zone, the more permeable zone takes about ten times as much liquid as the less permeable zone. Thus, the more permeable zone gets about 545 gallons per foot of thickness, while only about 55 gallons per foot enter the less permeable zone. Assuming about 20 percent porosity in both zones, the solution penetrates the more permeable zone to a distance of about 10 feet from the well. It penetrates the less permeable zone to a distance of about 3 feet.

When enriched gas is injected into the formation, foam is generated in both zones. Since there is about ten times as much foaming agent in the more permeable zone, a much larger amount of foam forms in this zone. Another factor increases this contrast. An oil-sensitive foaming agent has been deliberately selected. With such an agent, the more the oil, the less the volume of foam. This can be shown by a simple shaking test described in U.S. 3,330,346, Jacobs et al. The portion of the highly permeable zone near the injection well has less oil than the less permeable zone. The reason is that the large volume of foaming agent solution has swept most of the oil out of the portion of the highly permeable zone near the injection well. The much smaller volume of foaming agent solution entering the low permeability zone removes only a small amount of oil from this zone. The high oil saturation in the less permeable zone causes a small volume of foam to be formed. A larger volume of foam is formed in the high permeability zone per unit volume of foaming agent solution because of the lower oil content of the highly permeable zone.

Still another factor which is even more important is foam stability. Flow tests have indicated that the more the oil content, the less stable is the foam. Thus, in the low permeability zone from which little oil has been displaced by the foaming agent solution, the foam breaks quickly. In the high permeability zone, from which much of the oil has been displaced, the foam remains relatively stable over a much longer period of time. After a few days, the low permeability zone recovers much of its original permeability, while the high permeability zone does not. Therefore, after injecting enriched gas for a few days, the rate of injection into the low permeability zone may actually become greater than the rate of injection into the formerly high permeability zone. This condition can persist until all the enriched gas and a portion of the dry gas has been injected. Eventually, of course, the foam in the high permeability zone breaks to at least some extent permitting this zone to regain at least part of its permeability so the volume of enriched gas in the high permeability zone can catch up with that in the low permeability zone. A much more effective recovery of oil in the less permeable zone can thus be obtained without greatly delaying the time of recovery of oil from the more permeable zone.

Various types of foaming agents are listed in Table I of U.S. Patent 3,330,346, Jacobs et al., to which reference has been previously made. Others are listed in U.S. Patent 3,318,379, Bond et al. Still others will occur to those skilled in the art. The agent to be used, as well as the concentration of such agent in the solution injected into the oil-bearing formation, will, of course, vary somewhat with the salinity of the water in which it is dispersed or dissolved, the nature of the brine and oil naturally present, and the like. In general, the agent should be used in a concentration of about 1 or 2 percent by weight of the solution. A concentration of less than about 0.1 percent usually is not advisable because the agent is lost too quickly by adsorption on formation surfaces, solution in the formation oil and brine, or the like. Concentrations as low as 0.01 percent by weight have been observed to produce some benefits, however. Concentrations in the range of about 5 to 10 percent may cause a change in the nature of the foam, leading to less plugging action than is produced at lower foaming agent concentrations. Therefore, use of more than about 5 or 10 percent is often inadvisable not only because of the greater cost, but because of poorer results. Obviously, one advantage of the flow test to determine oil sensitivity is that the same test can be used to check the effects of foaming agent concentration in the particular brine and oil system to which it is to be applied.

The volume of foaming agent solution should ordinarily be sufficient to fill the pore spaces of the oil-bearing formation to an average distance of about 6 or 7 feet from the well. As explained above, in the example, the more permeable zones will receive much more than this amount, while the lower permeability zones will receive much less. If, for some reason, it is desired that the foam should break more quickly, a smaller volume of foaming agent can be used. For example, only a short time may be required to inject a small volume of enriched gas, the small volume being used because of relatively close well spacing. In other cases, for example, if one zone is 20 or 30 times as permeable as another, a more permeament foam in the more permeable zones may be desired, so a larger volume of foaming agent solution may be used.

The volume of the enriched gas to be used can vary widely, as explained in U.S. Patent 2,880,801, Crump. This volume should normally be at least about 1 percent and usually about 2 to 5 percent of the pore volume expected to be flooded. The amount of enrichment generally should be sufficient to result in a miscible fluid drive. Somewhat less than this amount of enrichment can be used in some cases, if desired, however.

Certain techniques can be used to remove some of the oil from the formation immediately surrounding the well before a foaming agent solution is injected. The object is to increase the contrast in permanence of the foam in the high and low permeability zones. For example, a small batch of liquid propane may be injected followed by dry gas and then the foaming agent solution. The propane tends to displace oil from around the well, the dry gas serving to evaporate the propane. Between the propane and oil, there is a mixing zone. As the propane moves out from the well, more of the propane is required to maintain the mixing zone at a stable length. Eventually, the volume of propane in the mixing zone equals the total volume of propane injected. As the mixing zone moves on out away from the well from this point, an increasing amount of oil is left behind in the formation. The point at which oil begins to be left behind depends on the amount of propane injected. The less the propane, the closer this point is to the well. If a very small amount of propane is injected, some oil is left immediately adjacent the well.

If a first zone of a formation has a premeability ten times as great as a second zone, the first one will receive about ten times as much propane as the second. If only a small volume is injected, about enough to fill the first 2 or 3 feet of formation away from the well on the average, little propane enters the less permeable zone, so considerable oil remains near the well. In the high permeability zone, however, the oil is substantially entirely removed from the zone a few feet out from the well. The dry gas removes the propane leaving a section substantially free from liquid hydrocarbons in the highly permeable zone. When a foam is formed in the high and low permeability zones, the foam is rather stable in the high permeability zone which contains little liquid hydrocarbons while the foam, being oil-sensitive, is unstable in the low permeability zone which still contains some liquid oil.

While the use of the pre-wash with a petroleum solvent obviously has a considerable advantage in my process, it should be used with caution to avoid a substantially permanent foam in the high permeability zone. After substantially all the enriched gas has been injected, or even after all the enriched gas and some dry gas have been injected, it may become apparent from the injectivity rates that the high permeability zones contain a substantially permanent foam. In this case, it may be desirable to break the foam by injecting a liquid hydrocarbon into the formation. Preferably, the liquid hydrocarbon should be rather volatile, such as propane, butane or pentane, so that after it breaks the foam, it will evaporate in the dry gas, opening all the pores to flow of injected gas. This foam-breaking technique can, of course, be used in appropriate cases whether the petroleum solvent pre-treatment is used or not.

It may be preferred to use as an oil solvent one which is also water-soluble. For example, an alcohol or ketone, such as isopropanol or acetone, may be used. These solvents, being water-miscible, are displaced ahead of the aqueous foaming agent solution so no dry gas is required as when low molecular weight liquid hydrocarbons are used. Possibly the most desirable technique is to use a small portion of the enriched gas itself ahead of the foaming agent solution to remove oil from the more permeable zones to a short distance from the well. This is particularly desirable if the gas is enriched sufficiently to produce a miscible fluid drive. All these methods are examples of treatments which remove more liquid hydrocarbon from high permeability zones than from low permeability zones.

It may be advisable in some cases to inject a small volume of water into the formation after the foaming agent solution and before the enriched gas, as described in U.S. Patent 3,318,379, Bond. The reason is to improve the injectivity of the enriched and dry gases by avoiding foam formation immediately adjacent the well bore. If this technique is used, however, only a very small volume of water, such as about 5 or 10 percent of the volume of foaming agent solution, should be used. This is because this technique decreases the foam-plugging contrast between high and low permeability zones. Thus, use of the technique is generally undesirable. In some cases, however, it is best to sacrifice a little of the plugging contrast in order to obtain a high injectivity.

The above descriptions are presented principally as examples. Many variations will be apparent to those skilled in the art. Therefore, I do not wish to be limited to the specific methods described, but only by the following claims.

I claim:
1. In a method for recovering petroleum from an oil-bearing earth formation penetrated by an injection well and a producing well in which process an enriched hydrocarbon gas is injected through the injection well and into the oil-producing formation to displace oil to the producing well from which the oil is recovered, the improvement comprising injecting into the formation ahead of the enriched hydrocarbon gas an aqueous solution of an oil-sensitive foaming agent capable of forming in the formation a foam sufficiently unstable in the presence of the oil in the formation to permit return of from about 5 to about 50 percent of the original permeability in 30 days in the following test:
  (a) form a sand pack 35 feet long of No. 16 sand,
  (b) fill said pack with brine at least similar to that naturally present in said formation,
  (c) displace the brine with oil naturally present in said formation,
  (d) displace the oil to substantially irreducible minimum content by flooding with said brine,
  (e) introduce a quantity of said foaming agent solution equal to about 20 percent of the sand pack pore volume,
  (f) apply enriched gas to be used in the drive, said gas being applied at a pressure of about 150 pounds per square inch gauge to the end of said pack containing said foaming agent solution, the downstream end of said pack being at substantially atmospheric pressure,
said enriched hydrocarbon gas being capable of forming a miscible fluid drive with the oil in the formation.

2. The method of claim 1 in which the injection of said foaming agent solution is preceded by a treatment capable of removing more liquid hydrocarbons from high permeability zones near the well bore than from low permeability zones.

3. The method of claim 2 in which said treatment consists of injecting a small batch of enriched hydrocarbon gas into said formation ahead of said foaming agent solution.

4. The method of claim 1 in which the concentration of said foaming agent in said foaming agent solution is between about 0.1 and about 5 percent by weight of said solution.

5. The method of claim 1 in which the volume of said foaming agent solution is sufficient to fill the pore volume of said formation to a distance of about 7 feet from said well bore.

References Cited
UNITED STATES PATENTS

| | | | |
|---|---|---|---|
| 2,880,801 | 4/1959 | Crump | 166—9 |
| 3,177,939 | 4/1965 | Holm et al. | 166—9 |
| 3,318,379 | 5/1967 | Bond et al. | 166—9 |
| 3,330,346 | 7/1967 | Jacobs et al. | 166—9 |

STEPHEN J. NOVOSAD, Primary Examiner

U.S. Cl. X.R.
166—274, 275